July 31, 1951  R. R. RANEY ET AL  2,562,576
TWO-SPEED DRIVE

Filed Nov. 16, 1949  2 Sheets-Sheet 1

Inventors:
Russell R. Raney
Bernard E. Brown
Paul O. Pippel
Atty.

July 31, 1951  R. R. RANEY ET AL  2,562,576
TWO-SPEED DRIVE

Filed Nov. 16, 1949  2 Sheets-Sheet 2

Inventors:
Russell R. Raney
Bernard E. Brown
Paul O. Pippel
Atty.

Patented July 31, 1951

2,562,576

UNITED STATES PATENT OFFICE 2,562,576

TWO-SPEED DRIVE

Russell R. Raney, La Grange, and Bernard E. Brown, Chicago, Ill., assignors to International Harvester Company, a corporation of New Jersey Application November 16, 1949, Serial No. 127,714

8 Claims. (Cl. 74—220)

The present invention relates to combined side delivery hay rakes and tedders and more particularly to a power transmitting mechanism for rotating the rake mechanism at a particular speed in one direction for raking and in a reverse direction at a higher speed for tedding.

The present day power transmitter mechanisms used in combined side delivery hay rakes and tedders are costly to manufacture since they generally require the employment of complicated clutching devices. Power is transmitted from the ground-engaging wheels to a shaft having a sprocket and a gear keyed thereto. A second shaft loosely carries a gear meshing with the above mentioned gear and a sprocket drivingly connected to the aforementioned sprocket. A clutching device locks either the gear of the sprocket to the second shaft depending on the desired direction of rotation of the second shaft. The present invention contemplates and has for one of its objects the elimination of a costly, complicated clutching device.

Another object is the provision of a simple two-speed reversible power transmitting mechanism which is particularly useful in combined side delivery hay rakes and tedders.

Still another object is the provision of a novel arrangement of sprockets and sprocket chains to transmit power in a forward and reversed direction at different speeds.

A further object is the provision of a simple, inexpensive clutching means.

The foregoing and other important objects and desirable features inherent in and encompassed by the invention together with many of the purposes and uses thereof will become readily apparent from a reading of the ensuing description in conjunction with the annexed drawings in which.

Figure 1:
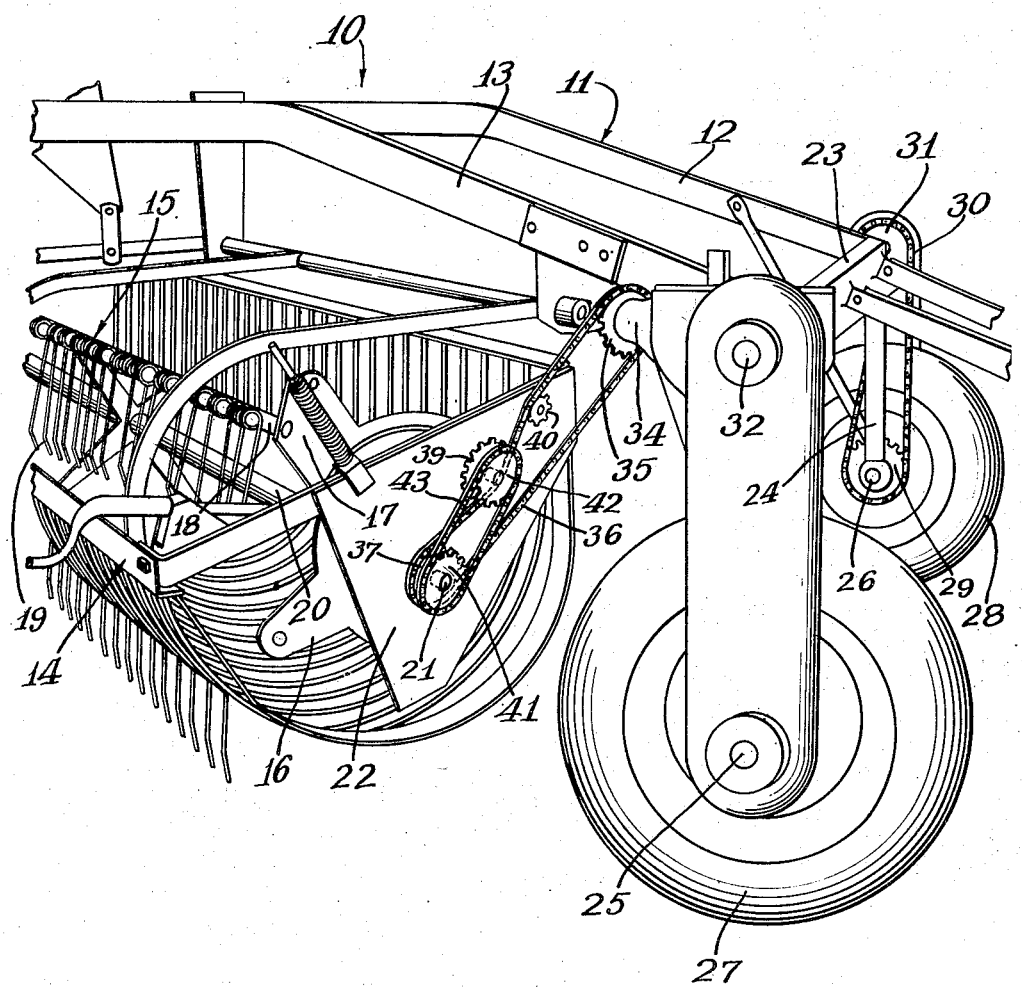
Fig. 1 is a perspective view showing the power transmitting mechanism positioned on a side delivery rake and tedder.
Figure 2:
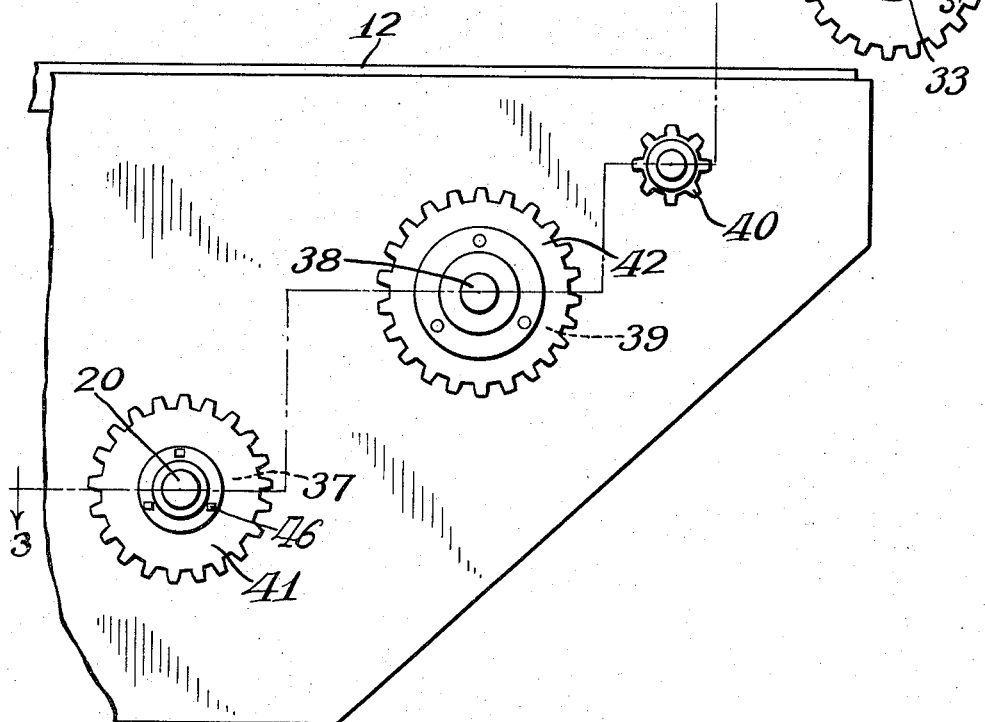
Fig. 2 is a detailed side elevational view of the power transmitting mechanism.
Figure 3:
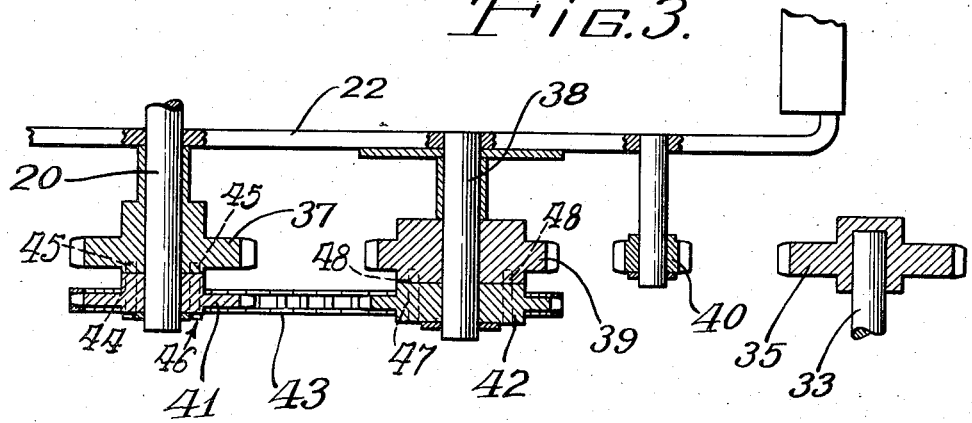
Fig. 3 is a plan view of the power transmitting mechanism.

Referring to the drawings in which like reference characters represent like elements throughout the various views, there is shown a portion of a side delivery rake and hay tedder 10. The side delivery rake and hay tedder 10 includes a frame structure 11 partially shown in Fig. 1 comprising a pair of rearwardly extending laterally spaced longitudinal frame members 12 and 13. The frame structure 11 pivotally supports a rake cylinder supporting frame 14. The supporting frame 14 partially shown in Fig. 1 is of rectangular construction and may consist of a plurality of angle frames members.

The supporting frame 14 supports a rake cylinder which includes a pair of laterally spaced spiders 16, only one of which is shown, having spider arms 17. The spider arms 17 are each connected by an angularly extending tubular rod or carrying bar 18 which supports a plurality of rake teeth 19 in a conventional manner. The spiders 16 are rigidly secured to a rotatable reel shaft 20 extending the length of the supporting frame 14. The reel shaft 20 is suitably journaled for rotation at each end of the supporting frame 14. One end 21 of the reel shaft 20 is carried by a downwardly depending plate-like bracket member 22 rigidly fastened to the supporting frame 14.

Forwardly of the rake cylinder 15 the frame structure 11 is provided with a transversely extending frame member 23 having its ends rigidly secured by welding or other means to the frame members 12 and 13. Depending from the frame member 23 are a pair of axle supports 24, one of which is shown, which rotatably support the axle members 25 and 26. Secured to each axle member 25—26 for rotation therewith is a ground-engaging wheel 27—28.

Secured to each ground-engaging wheel 27—28 and adapted to rotate therewith is a sprocket 29 which drives an endless chain 30. Each drive chain 30, only one of which is shown, extends upwardly and is trained around sprockets 31 rigidly secured adjacent the ends of a transversely extending shaft 32 for rotating the shaft.

Through suitable power transmission gearing the shaft 32 rotates a triangularly extending stub shaft 33 journaled in a bearing member 34 rigidly fastened to frame member 23. It is to be understood that shaft 33 will only rotate in one direction when the side delivery rake and hay tedder 10 is drawn forwardly by the draft means. Keyed to or otherwise fastened to one end of the shaft 33 is a chain sprocket 35 arranged to drive a chain 36. Loosely journaled adjacent one end of the reel shaft 20 is chain sprocket 37. Forwardly of and above the reel shaft is a non-rotatable shaft 38 having one end firmly held in the bracket 22. A chain sprocket 39 having the same pitch diameter as chain sprocket 37 is rotatably supported by the shaft 38. The chain 36 is trained beneath sprocket 39 and over the sprocket 37 whereby rotation of the sprocket 35 causes sprockets 37 and 39 to rotate in opposite directions at the same speed. An idler sprocket 40 is rotatably carried by the bracket 22 to maintain the chain 37 taut and in meshing engagement with the sprocket 39.

Adjacent the chain sprocket 37 another chain sprocket 41 is rigidly secured to the reel shaft 20. It will be noted that sprocket 41 has a smaller pitch diameter than sprockets 37 and 39. Positioned on the shaft 38 adjacent the sprocket 39 is a rotatably mounted chain sprocket 42 which is drivingly connected to sprocket 41 by means of an endless sprocket chain 43. Sprocket 41 has a plurality of circumferentially spaced axially disposed apertures 44 which are alignable with threaded apertures 45 extending partially through sprocket 37. It will be appreciated that a bolt 46 may be inserted in each aperture 44 and threaded into one of the apertures 45 to firmly and easily clutch or lock sprocket 41 to sprocket 37 whereby rotation of sprocket 41 will result in rotation of the reel shaft 20. Inasmuch as the raking mechanism in a side delivery rake and hay tedder when being operated as a rake must move over the ground in the same direction or at an angle inclined toward the line of advance, it will be apparent that the foregoing structure accomplishes this movement. Movement of the side delivery rake and hay tedder forwardly imparts a clockwise rotation to the ground wheels 27—28 as viewed in Fig. 1 which in turn through the aforementioned transmission gearing rotates stub shaft 33 and driving sprocket 35 in a counterclockwise direction. Since the sprocket chain 36 is arranged to drive sprocket 37 in the same direction it will be appreciated that when the sprocket 37 is locked to the sprocket 41 the reel shaft 20 will also rotate in a counterclockwise direction to move the raking mechanism over the ground in the same direction as the forward movement of the side delivery rake and hay tedder. Sprockets 39 and 42 being drivingly connected to sprockets 37 and 41 respectively act as idler sprockets when the raking mechanism is being operated as a rake.

In farm implements of the type being described the tedding operation is accomplished by rotating the raking mechanism in a direction opposite to or reversed to the direction of rotation when raking and at a higher speed. The raking mechanism when operated as a tedder moves in a reverse direction. That is, with a movement over the ground in a direction opposite or at an angle inclined rearward from that of the line of advance of the farm implement. In order to rotate the reel shaft 20 clockwise as viewed in Fig. 1 the aforementioned bolts 46 are removed from the apertures 44 and 45 and inserted in similar apertures 47 and 48 in sprockets 39 and 42, whereby sprockets 39 and 42 are locked together and sprockets 37 and 41 are unlocked. The drive sprocket 35 rotates in a counterclockwise direction as in the raking operation. However, the power transmission is not by way of sprocket 37 as in the raking operation, since sprocket 37 is now independently revoluble on the shaft 20. The chain 36 rotates sprocket 39 in a clockwise direction and therefore sprocket 42 in the same direction because of their locked condition. Rotative power is then transmitted to sprocket 41 by the sprocket chain 43. It will be apparent that the sprocket 41 is rotated in a clockwise direction as viewed in Fig. 1 to drive the reel shaft 20 in the same direction to obtain the proper direction of rotation of the raking mechanism for the tedding operation. Inasmuch as sprocket 42 has a greater pitch diameter than sprockets 41 and 37 the reel shaft will be rotated at a higher speed in a clockwise direction than in a counterclockwise direction.

From the foregoing description it will be realized that an efficient inexpensive reversible drive mechanism has been presented which is simple in construction and yet is durable and easily maintained. The embodiment of the invention chosen for the purpose of illustration and description herein is that preferred for achieving the objects of the invention and developing the utility thereof in the most desirable manner, due regard being had to the improvements sought to be effected. It will be appreciated therefore that the particular structural and functional aspects emphasized herein are not intended to exclude but rather to suggest such other adaptations and modifications of the invention as fall within the spirit and scope of the invention as defined in the appended claims.

What is claimed is:

1. A power transmission mechanism comprising a driving shaft having a driving sprocket secured thereto; a driven shaft having a first idler sprocket independently revoluble thereon, said first sprocket having a plurality of axially disposed, threaded apertures therein; a countershaft parallel to said driving and driven shafts having a second idler sprocket independently revoluble thereon, said second sprocket having a plurality of axially disposed, threaded apertures therein; means drivingly connecting said driving, first, and second sprockets whereby said first sprocket rotates in a direction opposite to the direction of rotation of said second sprocket, said means including an endless sprocket chain driven by said driving sprocket and trained under said second sprocket and over said first sprocket; a third sprocket secured to said driven shaft having a plurality of apertures alignable with the apertures of said first sprocket; a fourth sprocket independently revoluble on said countershaft having a plurality of apertures alignable with the apertures of said second sprocket; a second endless chain drivingly connecting said third and fourth sprockets; and means to selectively interlock either said first sprocket to said driven shaft to rotate said driven shaft in one direction or to interlock said second sprocket to said countershaft to rotate said driven shaft in a reverse direction, said means including a plurality of threaded members insertable in the apertures of said first and third sprockets or in the apertures of said second and fourth sprockets.

2. A power transmission mechanism comprising a driving shaft having a driving sprocket secured thereto; a driven shaft having a first sprocket independently revoluble thereon, said first sprocket having a clutch element; a countershaft parallel to said driving and driven shafts having a second sprocket independently revoluble thereon, said second sprocket having a clutch element; means drivingly connecting said driving, first, and second sprockets whereby said first sprocket rotates in a direction opposite to the direction of rotation of said second sprocket, said means including an endless sprocket chain driven by said driving sprocket and trained under said second sprocket and over said first sprocket; a third sprocket secured to said driven shaft adjacent said first sprocket, said third sprocket having a clutch element; a fourth sprocket independently revoluble on said countershaft adjacent said second sprocket, said fourth sprocket having a clutch element; a second endless chain drivingly connecting said third and fourth sprockets; and means for selectively engaging the clutch elements of said first and third sprockets to drive said driven shaft in one direction and for disengaging said clutch elements and engaging the clutch elements of said second and fourth elements to drive said driven shaft in an opposite direction.

3. A power transmission mechanism comprising a driven shaft having a first sprocket independently revoluble thereon, said first sprocket having a clutch element; a countershaft having a second sprocket independently revoluble thereon, said second sprocket having a clutch element; power transmitting means for rotating said first sprocket in a direction opposite to the direction of rotation of said second sprocket; a third sprocket secured to said driven shaft adjacent said first sprocket, said third sprocket having a clutch element; a fourth sprocket independently revoluble on said countershaft adjacent said second sprocket, said fourth sprocket having a clutch element; means drivingly connecting said third and fourth sprockets, said means including an endless chain; and means for engaging the clutch elements on said first and third sprockets and releasing the clutch elements on said second and fourth sprockets to drive said driven shaft in one direction and for disengaging the clutch elements on said first and third sprockets and engaging the clutch elements on said second and fourth sprockets to drive said driven shaft in an opposite direction.

4. A transmission mechanism for a combined side delivery rake and tedder comprising a drive shaft having a driving sprocket secured thereto; a countershaft having a first idler sprocket loosely mounted thereon; a reel shaft having a second idler sprocket loosely mounted thereon; an endless sprocket chain driven by said driving sprocket, said chain being trained under said first idler sprocket and over said second idler sprocket; a third sprocket loosely mounted on said countershaft; a fourth sprocket secured to said reel shaft; a second sprocket chain operatively connecting said third and fourth sprockets; and means for selectively interlocking said first idler sprocket and said third sprocket to rotate said reel shaft in one direction and for interlocking said second idler sprocket and fourth sprocket and disengaging said first idler sprocket and third sprocket to rotate said reel shaft in a reverse direction.

5. A power transmission for a combined side delivery rake and tedder comprising a rotatable drive shaft having a driving sprocket non-rotatively mounted thereon; a countershaft having a first idler sprocket rotatively mounted thereon; a reel shaft having a second idler sprocket rotatively mounted thereon; an endless sprocket chain driven by said driving sprocket and trained under said first idler sprocket and over said second idler sprocket; a third sprocket rotatively carried by said countershaft adjacent said first idler sprocket; a fourth sprocket non-rotatively carried by said reel shaft adjacent said second idler sprocket; a second endless chain operatively connecting said third and fourth sprockets; and means for selectively interlocking said first idler sprocket and said third sprocket whereby said reel shaft is driven in one direction and interlocking said second idler sprocket and said fourth sprocket whereby said reel shaft is driven in an opposite direction.

6. A power transmission mechanism comprising a driven shaft having a first rotatable member independently revoluble thereon, said first rotatable member having a plurality of axially disposed apertures therein; a second shaft having a second rotatable member independently revoluble thereon, said second rotatable member having a plurality of axially disposed apertures therein; power transmitting means for rotating said first rotatable member in a direction opposite to the direction of rotation of said second rotatable member; a third rotatable member secured to said driven shaft adjacent said first rotatable member, said third rotatable member having a plurality of apertures therethrough alignable with the apertures in said first rotatable member; a fourth rotatable member independently revoluble on said second shaft adjacent said second rotatable member, said fourth rotatable member having a plurality of apertures therethrough alignable with the apertures in said second rotatable member; means drivingly connecting said third and fourth rotatable members; and means to selectively interlock said first and third rotatable members to rotate said driven shaft in one direction or said second and fourth rotatable members to rotate said driven shaft in an opposite direction, said means including a plurality of members insertable in the apertures of said first and third rotatable members or in the apertures of said second and fourth rotatable members.

7. A power transmission mechanism comprising a driven shaft having a first rotatable member independently revoluble thereon; a second shaft having a second rotatable member independently revoluble thereon; power transmitting means for rotating said first rotatable member in a direction opposite to the direction of rotation of said second rotatable member; a third rotatable member secured to said driven shaft; a fourth rotatable member independently revoluble on said second shaft; means drivingly connecting said third and fourth rotatable members; clutches for connecting said first and third rotatable members and for connecting said second and third rotatable members; means for effecting selective engagement of one of said clutches and release of the other whereby said driven shaft may be driven in a forward and reverse direction.

8. A power transmission mechanism comprising a driven shaft having a first rotatable member independently revoluble thereon; a second shaft having a second rotatable member independently revoluble thereon; power transmitting means for rotating said first rotatable member in a direction opposite to the direction of rotation of said second rotatable member; a third rotatable member secured to said driven shaft; a fourth rotatable member independently revoluble on said second shaft; means drivingly connecting said third and fourth rotatable members; and means for selectively interlocking said first and third rotatable members to rotate said driven shaft in one direction and for interlocking said second and fourth rotatable members and disengaging said first and third rotatable members to rotate said driven shaft in a reverse direction.

RUSSELL R. RANEY.
BERNARD E. BROWN.

REFERENCES CITED

The following references are of record in the file of this patent:

UNITED STATES PATENTS

| Number | Name | Date |
|---|---|---|
| 687,146 | Fleckenstein | Nov. 1, 1901 |
| 893,621 | Garst | July 21, 1908 |
| 1,909,522 | Collins | May 16, 1933 |